US008620634B2

(12) United States Patent
Foslien Graber et al.

(10) Patent No.: US 8,620,634 B2
(45) Date of Patent: Dec. 31, 2013

(54) ENERGY RESOURCE ALLOCATION INCLUDING RENEWABLE ENERGY SOURCES

(75) Inventors: Wendy Foslien Graber, Woodbury, MN (US); Zdenek Schindler, Prague (CH); Petr Stluka, Prague (CH); Girija Parthasarathy, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 691 days.

(21) Appl. No.: 12/841,345

(22) Filed: Jul. 22, 2010

(65) Prior Publication Data

US 2011/0040550 A1     Feb. 17, 2011

Related U.S. Application Data

(60) Provisional application No. 61/228,448, filed on Jul. 24, 2009.

(51) Int. Cl.
   *G06F 17/50*     (2006.01)

(52) U.S. Cl.
   USPC ...... 703/5; 703/2; 703/19; 290/44; 415/208.1

(58) Field of Classification Search
   USPC ................. 703/5, 19; 290/44; 415/208.1
   See application file for complete search history.

(56) References Cited

U.S. PATENT DOCUMENTS

| | | | |
|---|---|---|---|
| 6,975,925 B1* | 12/2005 | Barnes et al. | 700/286 |
| 7,403,854 B1* | 7/2008 | Hurley et al. | 702/3 |
| 8,258,643 B2* | 9/2012 | Bonnet | 290/44 |
| 2004/0009063 A1* | 1/2004 | Polacsek | 416/1 |
| 2010/0054910 A1* | 3/2010 | DeRuyter et al. | 415/4.2 |
| 2010/0131216 A1* | 5/2010 | Pedersen | 702/60 |
| 2010/0196153 A1* | 8/2010 | DeRuyter et al. | 415/208.1 |
| 2011/0316284 A1* | 12/2011 | Tabatabaian | 290/55 |
| 2012/0139244 A1* | 6/2012 | Bonnet | 290/44 |

* cited by examiner

*Primary Examiner* — Thai Phan
(74) *Attorney, Agent, or Firm* — Schwegman, Lundberg & Woessner, P.A.

(57) ABSTRACT

A computer implemented method includes providing information related to wind speed and direction prediction to a wind turbine energy prediction module, providing wind energy production prediction information to a resource allocation engine, and combining the wind energy production prediction information with information about non-renewable energy resources to provide an output identifying energy production resources to use for optimal load servicing.

22 Claims, 8 Drawing Sheets

ENERGY RESOURCE ALLOCATION INCLUDING RENEWABLE ENERGY SOURCES

RELATED APPLICATION

This application claims priority to U.S. Provisional Application Ser. No. 61/228,448 (entitled ENERGY RESOURCE ALLOCATION INCLUDING WIND ENERGY, filed Jul. 24, 2009) which is incorporated herein by reference.

BACKGROUND

Renewable resources such as electricity generated via wind turbines are a key element in developing sustainable energy systems. However, wind generation is particularly variable, with much of the generation potentially occurring while there is limited demand, either within a microgrid or across the electrical grid as a whole.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
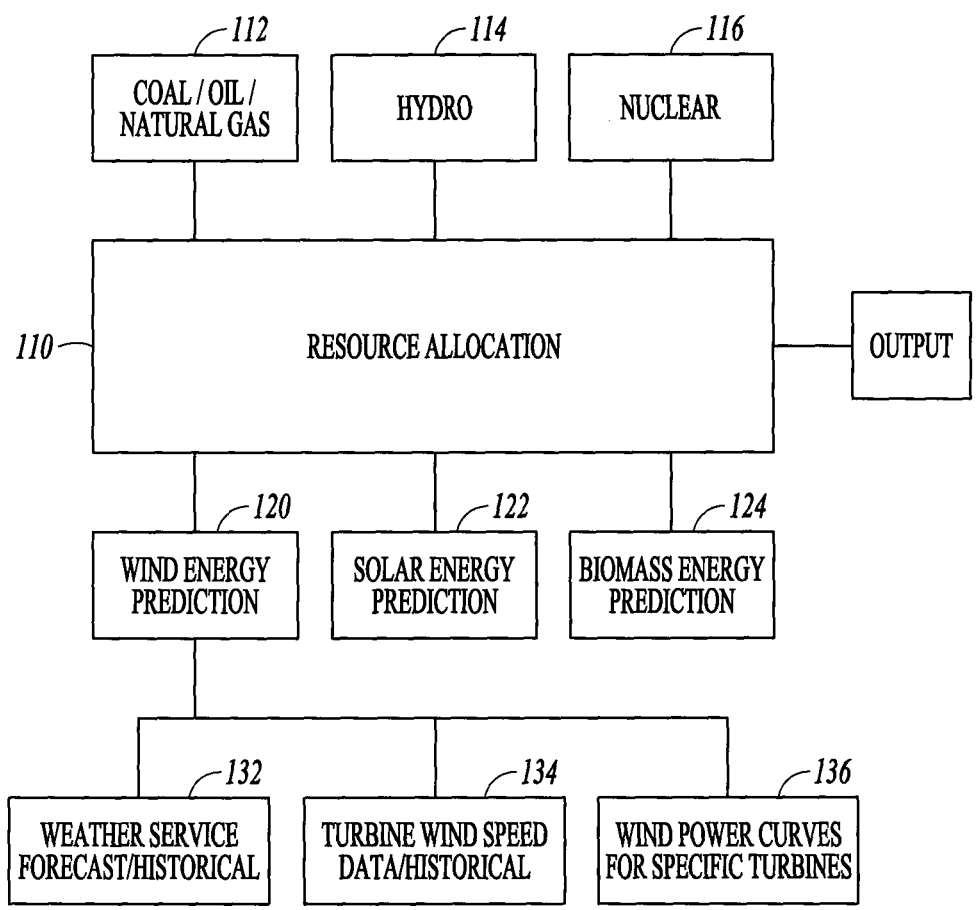
FIG. 1 is a block diagram of a resource allocation system including renewable energy prediction according to an example embodiment.

Renewable resources such as electricity generated via wind turbines or solar panels are a key element in developing sustainable energy systems. However, wind generation is particularly variable, with much of the generation potentially occurring while there is limited demand, either within a microgrid or across the electrical grid as a whole. There is a need for optimization strategies that can account for this variability, and provide a cost optimal usage of energy generated by these resources combined by other purchased or generated sources. Honeywell's core Versatile Energy Resource Allocation (VERA) application 110 in FIG. 1 includes optimization routines to provide optimal operations for distributed energy systems including coal/oil/natural gas 112, hydroelectric 114, and nuclear 116. However, prior versions of VERA are not capable of treating renewable resources, such as wind 120, solar 122 or biomass generation 124.

To accommodate renewable resources, VERA is enhanced to provide periodic (e.g., hourly, quarter-hour) predictions of energy production (electrical, thermal) available for the optimization routine to incorporate into calculations. These predictions are provided at 120, 122 and 124, providing the VERA economic optimizer enough information to identify how pre-specified loads can be satisfied using the equipment mix, and account for variations in prices. Thus, the integration with VERA is quite simple, as long as the predictions are available.

The simplest approach to wind generation prediction utilizes wind speed and direction forecasts available through a weather service 132, such as the services currently used for forecasting with Energy Manager, combined with wind power curves. The wind power curves may be representative of one or more individual turbines, and no forecaster need be applied. In some embodiments, the wind forecasts are refined using local wind speed and direction measurement historical data. The refined forecast that is local to a turbine or wind farm is then used with the power curves to obtain a power generation forecast. This approach works for a single turbine and for a wind farm represented as a sum of generators on the farm.

Another more sophisticated approach may include using historical data instead of wind power curves, in much the same manner as demand forecasting is accomplished within both the VERA and Energy Manager applications, and combining this with a weather service forecast. It may be referred to as a correlation method, as it utilizes a coarser weather forecast and in one embodiment correlates this forecast with local historical wind generation measurements of an individual wind turbine or a wind farm as a whole. The forecaster may directly eliminate local bias and turbine placement and implementation specifics.

Yet another approach is to use mesoscale meteorological simulation data 134, currently available from a service provider as an XML feed, combined with historical wind generation data. Mesoscale corresponds to a forecast for an intermediate size area, such as 2 to 200 or more kilometers in extent and provides more accurate local wind speed and direction forecasts. The forecaster may directly eliminate local bias and turbine placement and implementation specifics. In one embodiment, a coarse forecast is correlated with local topography to form a mesoscale forecast.

These approaches give varying levels of local detail and accuracy to the prediction of generated wind power, VERA may use any of these sources, with varying levels of accuracy in the optimization. In one embodiment, a simple lookup table having multiple power levels may be indexed with predicted average wind velocity and direction to determine the power output of one or more wind turbines. The integration of the prediction of the renewable generation with the VERA optimizer allows VERA to provide for optimal combination of energy producing resources, including renewable resources, with purchase of electricity from a public grid.

Optimizing routines take all available wind turbines as a basic uncontrolled resource. The fluctuations due to volatility of wind blow and varying demand cause imbalance, which is compensated for by well distributed employment of other both internal and external resources. The proportion of employment of each resource is dynamically determined by the VERA optimizer in real-time. For small fluctuations VERA utilizes incremental prices, but also all constraints on available capacities. In case of a large generation-demand imbalance due to prediction error or varying demand or in case of a substantial change in purchased energy prices, VERA can suggest a configuration change that utilizes available resources more economically, yet still allows for nonzero price of this configuration change.

Figure 2:
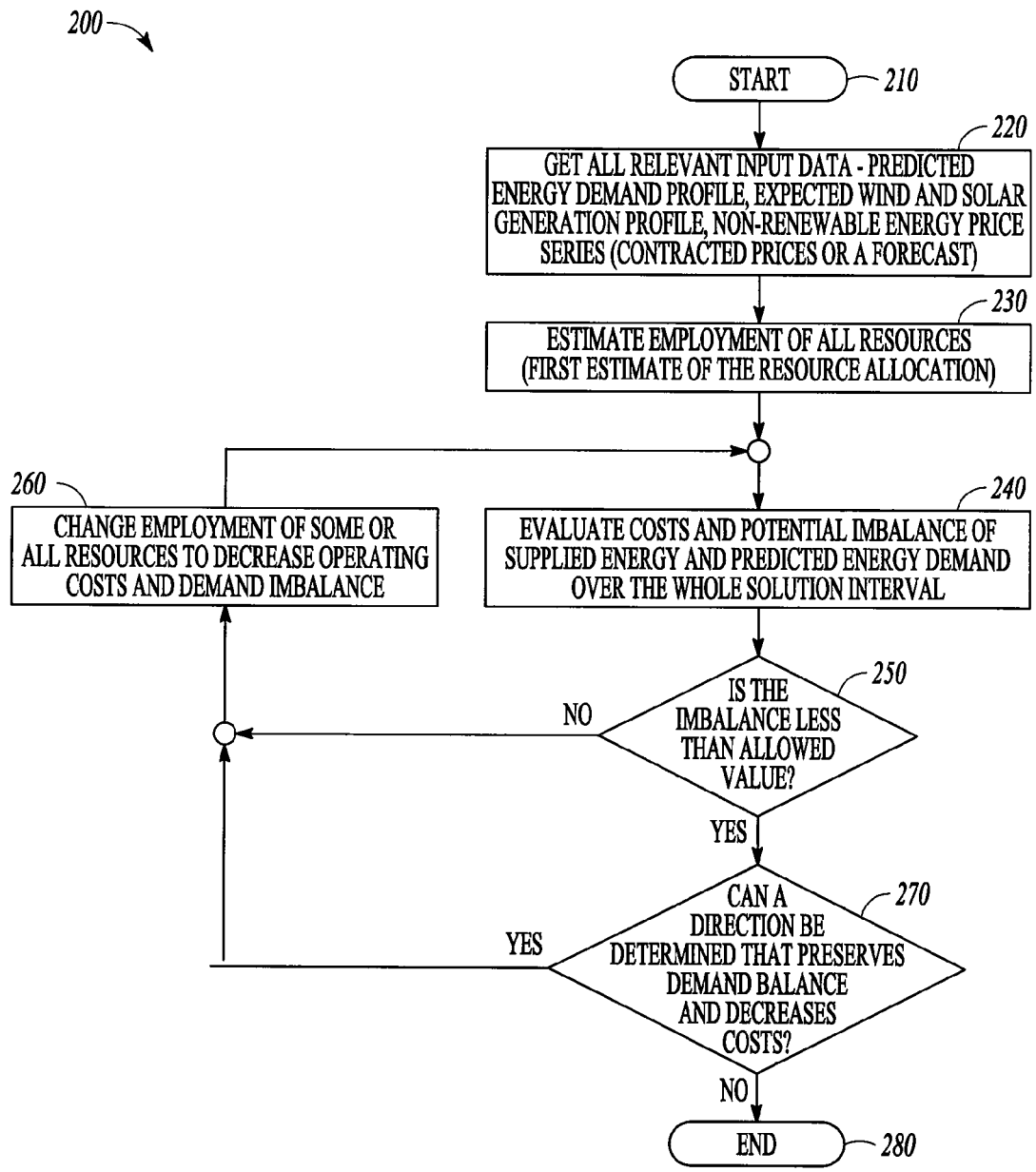
FIG. 2 is a flowchart illustrating an optimizing routine according to an example embodiment.

An example optimizing routine 200 is represented in flowchart form in FIG. 2. Routine 200 starts at 210, and at 220 all relevant input data is obtained, including predicted energy demand profile, expected wind and solar generation profile, non-renewable energy price series (contracted prices or a forecast). At 230, the optimizer estimates employment of all resources (first estimate of the resource allocation). At 240, an evaluation of operating costs and potential imbalance of supplied energy and predicted energy demand over a whole solution interval is performed. The solution interval is a period of time, such as part of hour, an hour, a period of expected peak demand during a day, a day, a week, or any other period of time desired.

At 250, a check is performed to determine if the imbalance is less than an allowed value. If not, at 260, a change is made to the employment of some or all resources to decrease operating costs and demand imbalance. If yes, at 270, a check is made to see if a direction can be determined that preserves demand balance and decreases costs exists. The term "direction" here refers to an employment vector of the wind generator. If such a direction cannot be determined, the optimizer ends at 280. If there is such a direction, the employment of resources is changed in this direction at 260. At each change of resources at 260, the optimizer returns to 240 to continue evaluation of the costs and potential imbalance of supplied energy and predicted energy demand over the whole solution interval.

Figure 3:
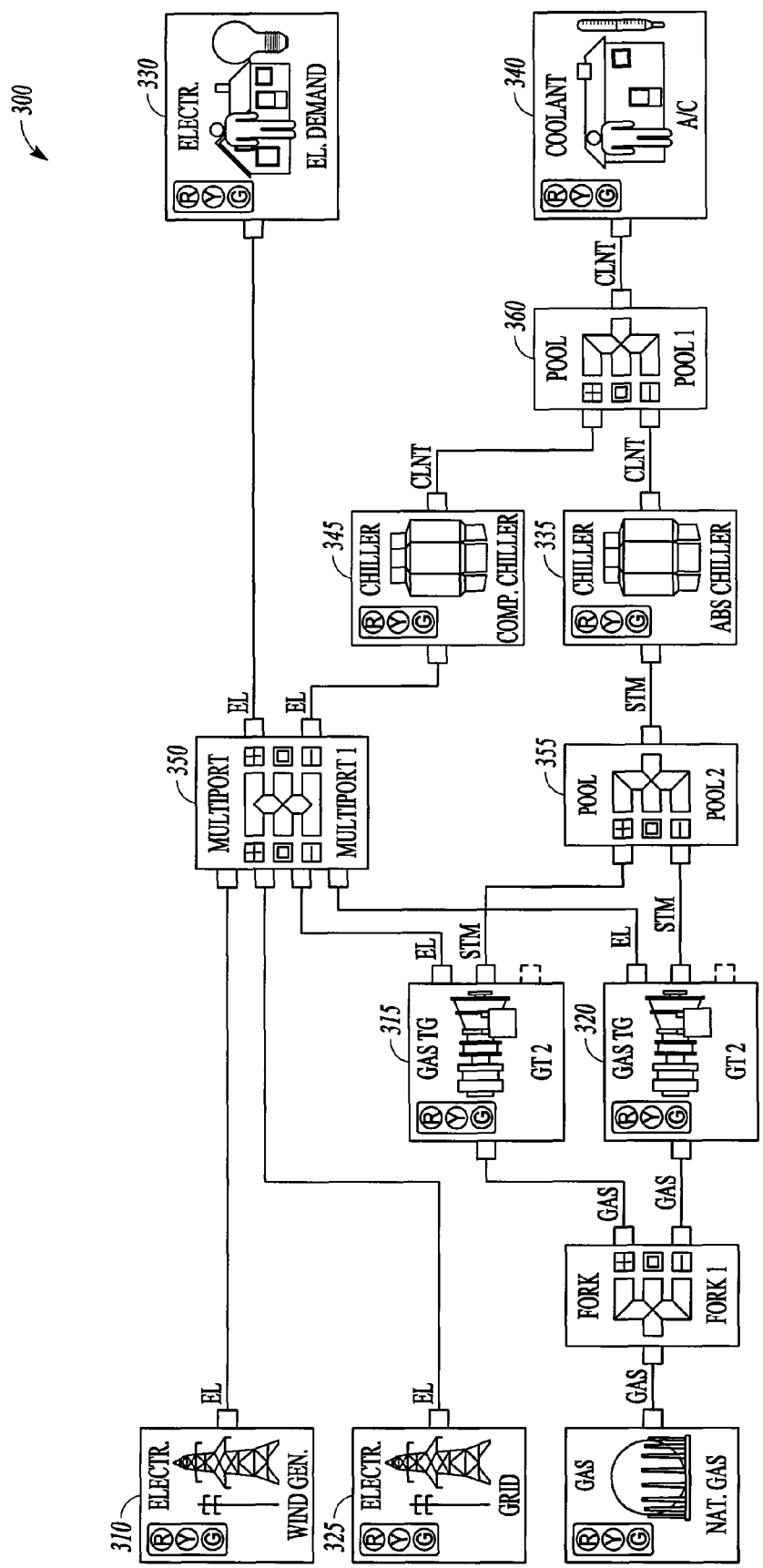
FIG. 3 is a block diagram illustrating employment of multiple electricity supplying devices according to an example embodiment.

FIG. 3 is a block diagram illustrating a system 300 including multiple electricity supplying devices according to an example embodiment. In one embodiment, the optimizer is used to determine an optimal schedule of employment of electricity supplying devices—a wind turbine (WindGen) 310 and two gas turbo-generators (GT1 and GT2) 315, 320 that support take-off from a common public grid electricity supply (Grid) 325. Total electricity delivery covers the demand of a building complex (ElDemand) 330. The surplus heat from GT1 and GT2 is utilized in absorption chiller AbsChiller 335 that supplies cool to a building heating ventilation and cooling (HVAC) system (A/C) 340 along with a common electrical compressor chiller (CompChiller) 345.

A multiport device 350 receives power on multiple ports from the supplying devices and provides the electricity to both the building complex 330 and the building HVAC system 340. A pool device 355 receives steam from the generators 315 and 320 and distributes if to the chiller 335. A further pooling device 360 receives chilled air from the chillers and distributes it to HVAC 340. This is a simplified example, and in further embodiments, there may be many more supplying devices and energy consuming devices. In this example, two cases with different wind generation profiles are compared below. While multiport, pools, and fork are shown as elements in FIG. 3, they may be thought of as virtual devices that represent energy distribution and energy flow junctions underlying the VERA model. The functions may be implemented by forked pipes or suitable electric wiring in physical manifestations of the model.

Figure 4A:
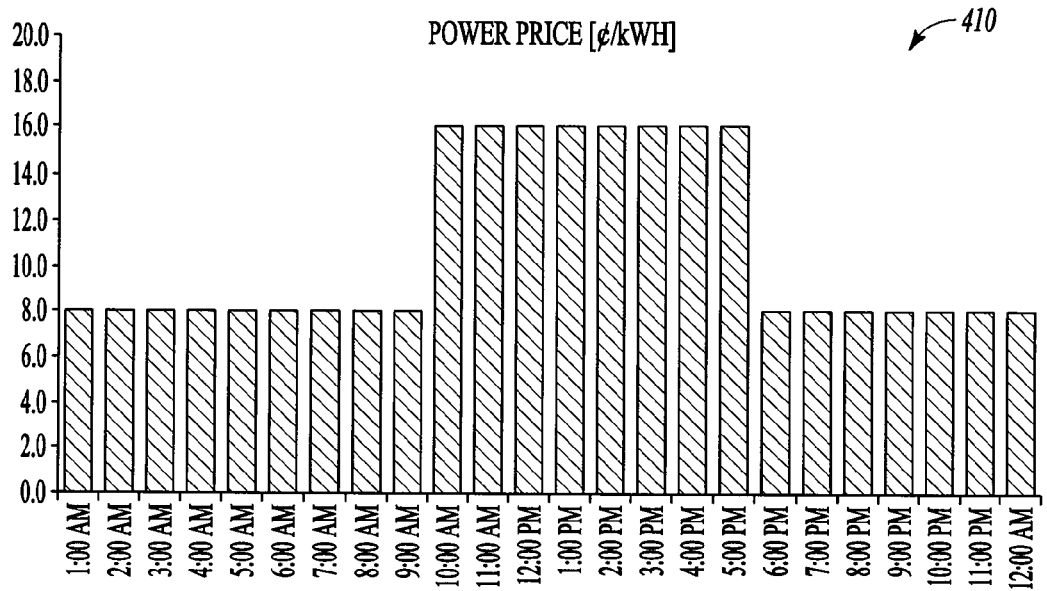
FIGS. 4A and 4B illustrate example profiles of electricity and gas prices over time according to an example embodiment.
Figure 4B:
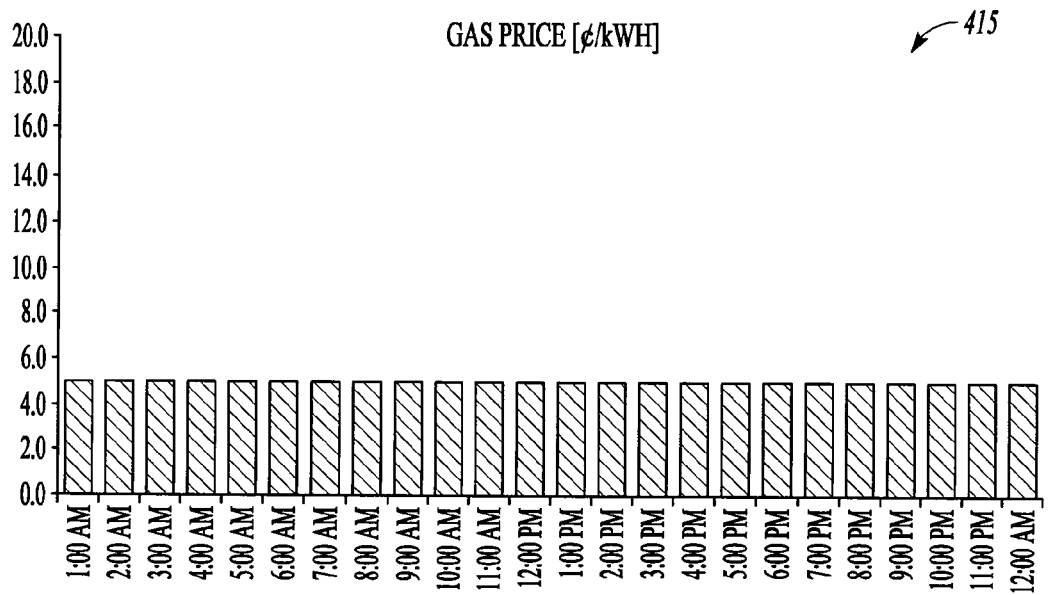

Example profiles of electricity and gas prices are illustrated in FIGS. 4A and 4B at 410 and 420 respectively. The electricity prices are shown as being higher during a period of peak demand running from mid morning to just before the evening hours, while gas prices are steady throughout the day.

Figure 5A:
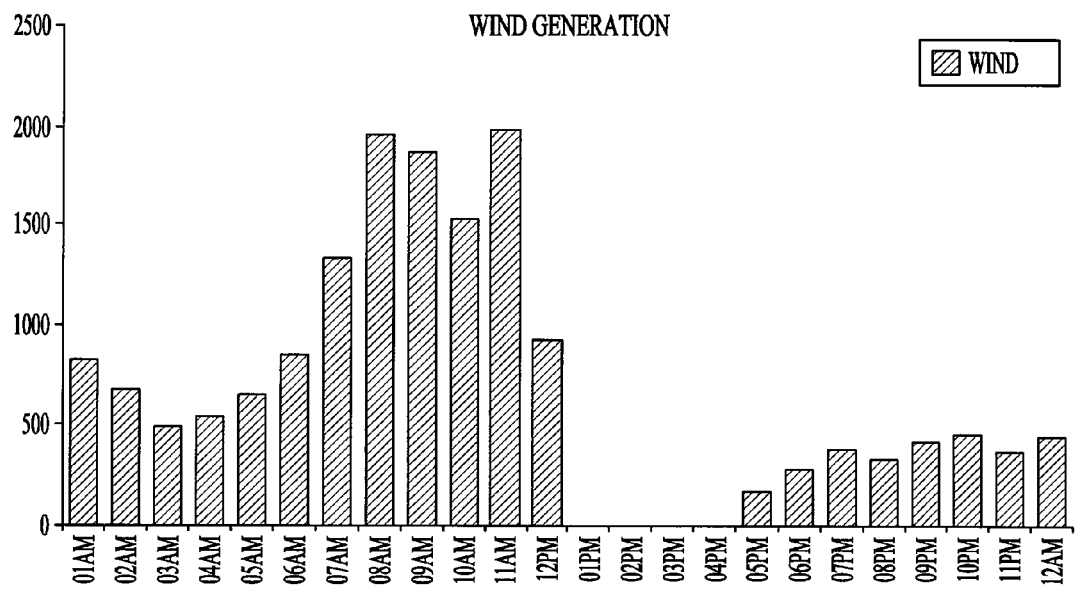
FIGS. 5A and 5B illustrate a wind generation daily profile forecast and corresponding optimized employment of resources according to an example embodiment.
Figure 5B:
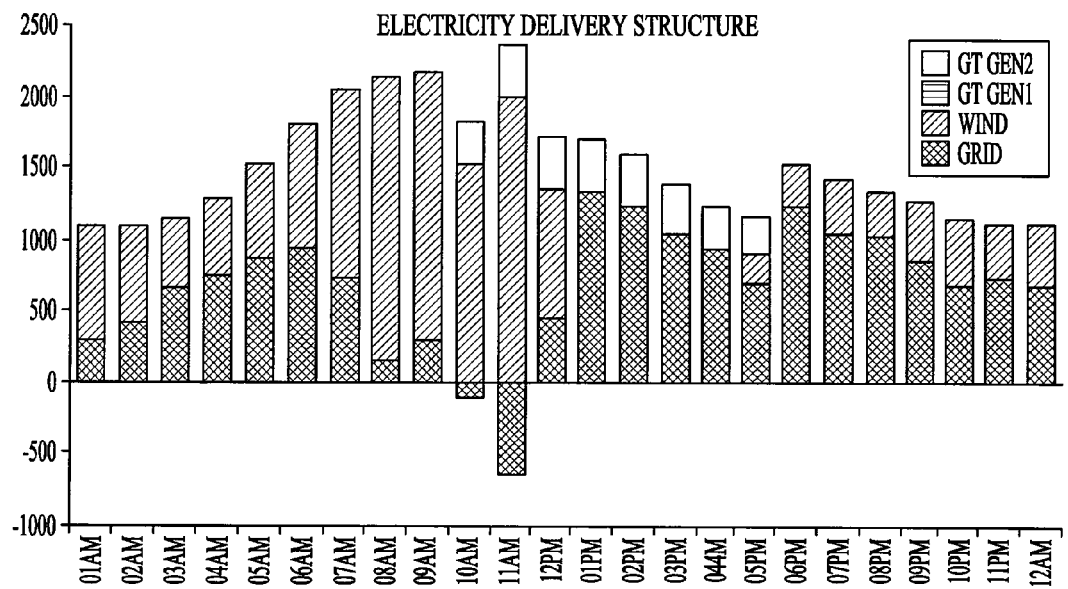

A first example is shown in FIGS. 5A and 5B where a wind generation daily profile forecast is shown at 510, and optimized employments of resources as determined by the optimizer are illustrated at 520. Two gas turbine cogeneration units are available besides grid power supply and wind generation. At 10:00 AM one of the two gas turbine is started (GT2), as the electricity price is high in peak hours. Excess electricity is sold back to the utility supplier. Excess heat produced by the gas turbine is utilized in absorption chillers. This configuration of resources and unit employment is the most economical one, as the costs run 2756 monetary units/day.

Figure 6A:
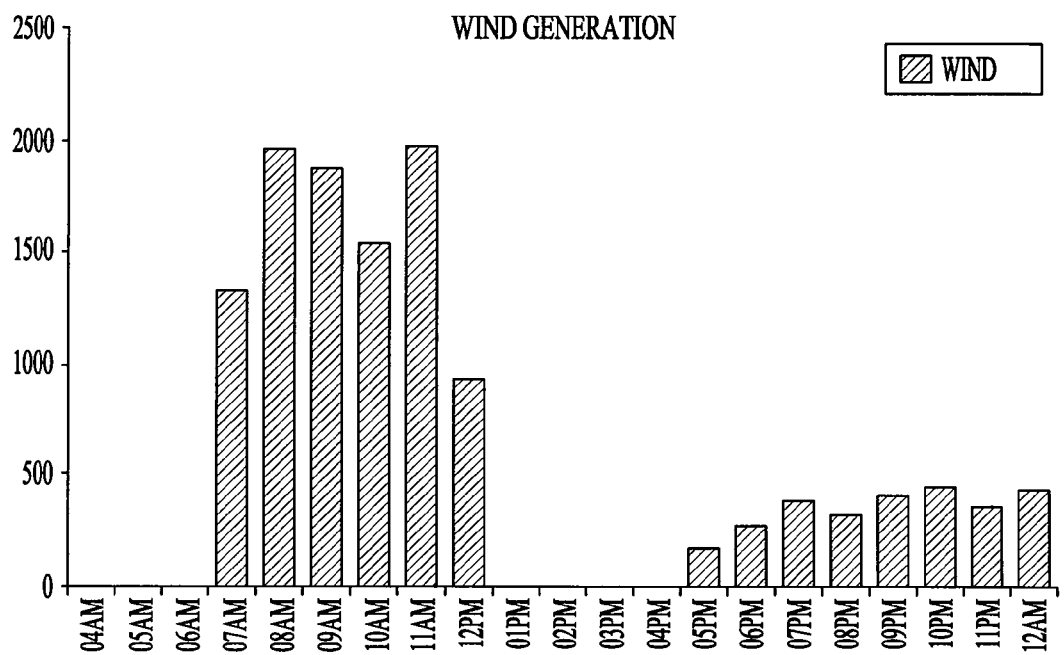
FIGS. 6A and 6B illustrate a wind generation daily profile forecast that includes scheduled maintenance along with a corresponding optimized employment of resources according to an example embodiment.
Figure 6B:
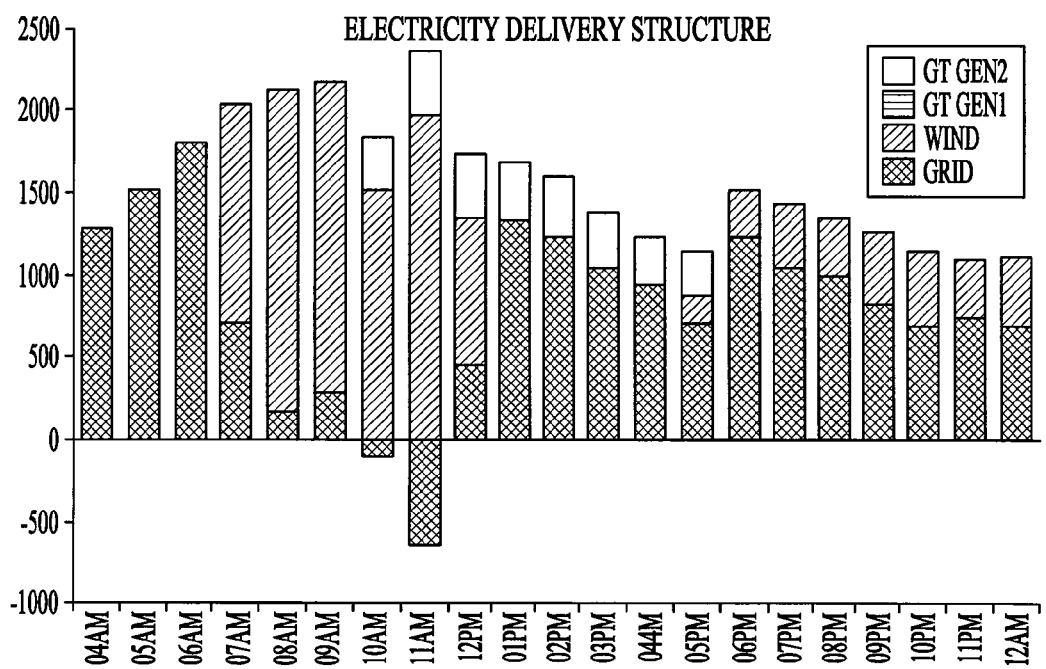

In a second example, as shown in FIGS. 6A and 6B, where a wind generation daily profile forecast is shown at 610, and optimized employments of resources as determined by the optimizer are illustrated at 620. In this example, the wind generation daily profile forecast 610 is based on a commercial weather forecast adapted for local conditions using historical wind generation data. However, here three hours lasting outage is planned starting at 4:00 AM.

The optimal employment of the resources 620 reflects the changed situation when updated at 3:45 AM. Again, two gas turbine cogeneration units are available besides grid power supply and wind generation. During the first wind generation drop out the electricity demand is covered by increased take off from the public grid. No turbine is employed, as the optimizer finds it not profitable. The rest of the employment schedule does not change.

In the employment schedule shown at 620, the cost is 3075 monetary units a day, an increase due to use of the grid power while the wind turbine is off line for scheduled maintenance. Not shown, is that if one of the gas turbo-generators is run to cover for the loss of the wind turbine from 4:00 AM to 6:00 AM, the cost would increase to 3920 monetary units.

Figure 7:
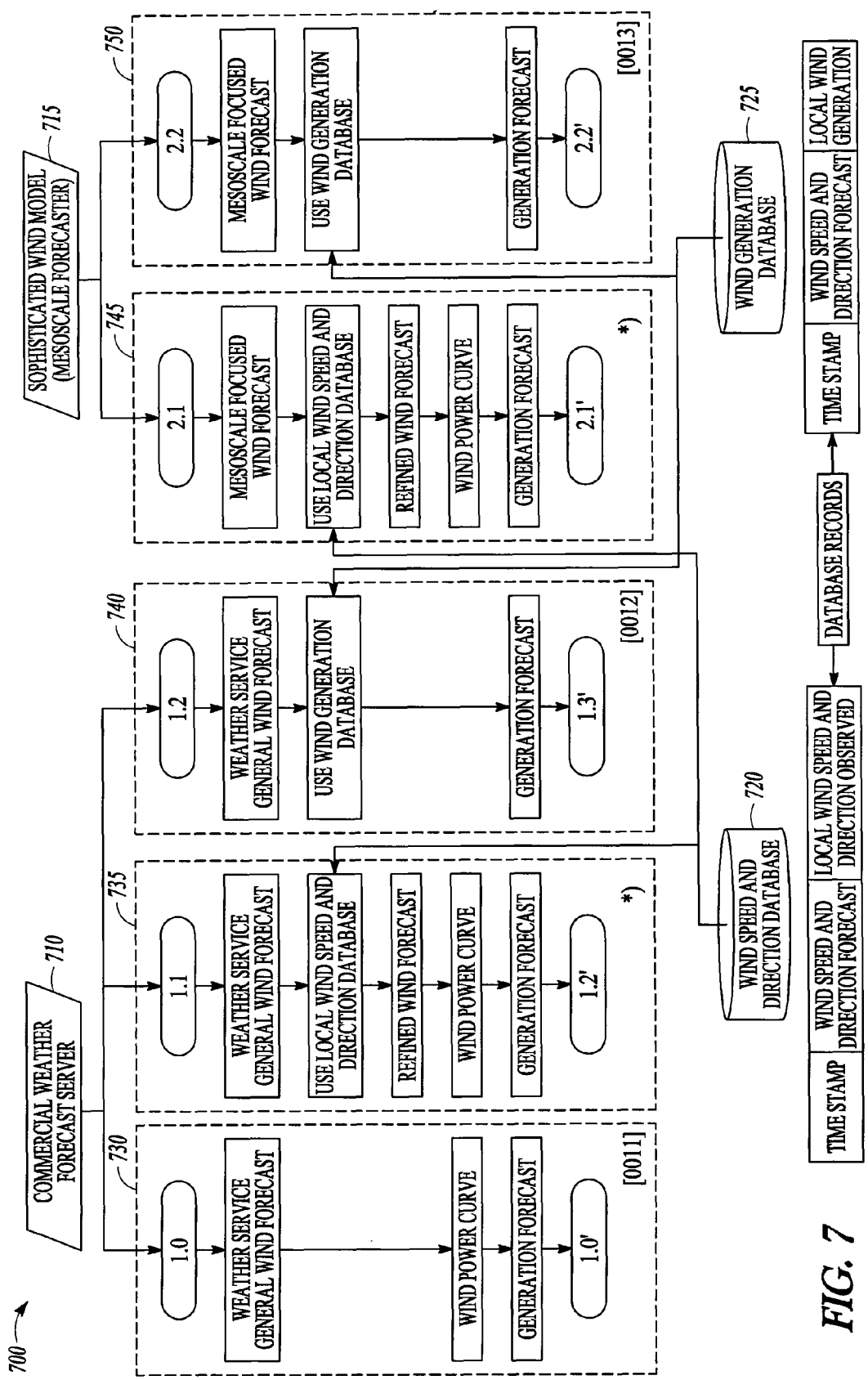
FIG. 7 is a block flow representation of alternative methods of providing wind power generation forecasts according to an example embodiment.

Several different methods of providing wind generation forecasts may be used and some are shown in FIG. 7 at 700. Some of the methods use commercial weather forecast servers at 710, while others utilize a mesoscale forecaster 715. A wind speed and direction database 720 and wind generation database 725 provide respective historical information to the various methods indicated at 730, 735, 740, 745, and 750.

In some embodiments, a wind power production forecast may be achieved with wind speed and direction forecasts for the wind turbine site, combined with wind turbine local wind speed data (from a supervisory control and data acquisition (SCADA) system such as an industrial control system, or independent wind speed measurement at the turbine), wind power curves (provided by manufacturer, or modeled based on data) or wind generation historical data. Wind speed forecasts can be based on general weather service data or mesoscale focused meteorological simulation data. The problem with using weather prediction data is that it is not at a fine enough spatial resolution for accurately estimating wind data at the wind turbine site. Usually, weather data is at the resolution of a zip code and local conditions at the site and height of the wind turbine could vary considerably from this forecast. Therefore, the local wind data and meteorological weather data is correlated in some embodiments.

A forecaster function in Honeywell's Decision Support Suite (DSS) may be used to forecast wind power production based on such a correlation and meteorological wind forecasts. This forecaster function is the same base technology that is used in Honeywell's Energy Manager to provide energy demand forecasts.

In one embodiment, the forecaster calculates the forecast directly from information contained in the process history database 725 (in this case wind generation history) and external data, such as meteorological forecasts 710, 715 (weather forecast wind prediction). The forecaster uses a database-intensive forecasting technology that implements on-line nonparametric statistical modeling and machine learning. The prediction algorithm works in two steps. First, a sample of data similar to the predicted situation is retrieved from the database. Then, the predicted value is computed by statistical interpolation or extrapolation from the sample using a linear or nonlinear model.

Since the DSS forecaster considers all relevant data contained in the archive database, forecast accuracy is typically higher than that achievable with traditional statistical modeling approaches, which typically employ only recent data. Compared with global models such as neural networks, the forecaster works on-line and is naturally adaptive—always incorporating the latest relevant data in forecasting.

In applications such as load forecasting, the forecasted variable is naturally affected by the weather conditions, such as outdoor temperature, wind velocity, wind direction, solar irradiation, and air humidity. Depending on the meteorological service and particular customer's contract, the meteorological forecast may vary significantly in detail. Typically, the forecast is in the form of most likely values at specified times and/or peak values over specified periods of time. Using this partial (coarse) information, the forecaster generates daily curves of forecasted variables by combining meteorological forecast and climatic data for a given locality. Calibration of the daily forecast curves compensates for a possible deviation of the on-site sensor readings from the weather service measurements. Calibrated daily forecast curves are continually updated so as to compensate for the latest forecast error.

The same principles apply for wind power forecasting at a particular wind turbine site. Based on history of power production, wind speed and direction, and given wind forecast (from weather forecast), the forecaster will be adapted to generate daily curves of wind power production. The daily forecast curves in one embodiment are calibrated for deviation of the on-site wind speed/direction measurement from the weather service measurements, and the daily forecast curve can be compensated for the latest forecast error.

The DSS forecaster routines provide a correlation model between the weather forecast wind data, and the local wind turbine generation data as illustrated at methods 730, 740, and 750. The correlation model ensures a more accurate prediction of power production from individual wind turbines or from the whole wind farm, rather than the coarser predictions based on coarse area weather forecast data and wind power curves. However, DSS forecaster may be used also for the prediction of the local wind speed and direction which is afterwards used as an input into wind power curves as illustrated at 735 and 745.

In further embodiments, environmental data, such as historical sun intensity data, time of day information and day of year information, may be used to provide information to predict the amount of solar energy production from solar energy devices. Biomass energy predictions may also be made using various methods, including crop forecasts and supply of biomass material.

Figure 8:
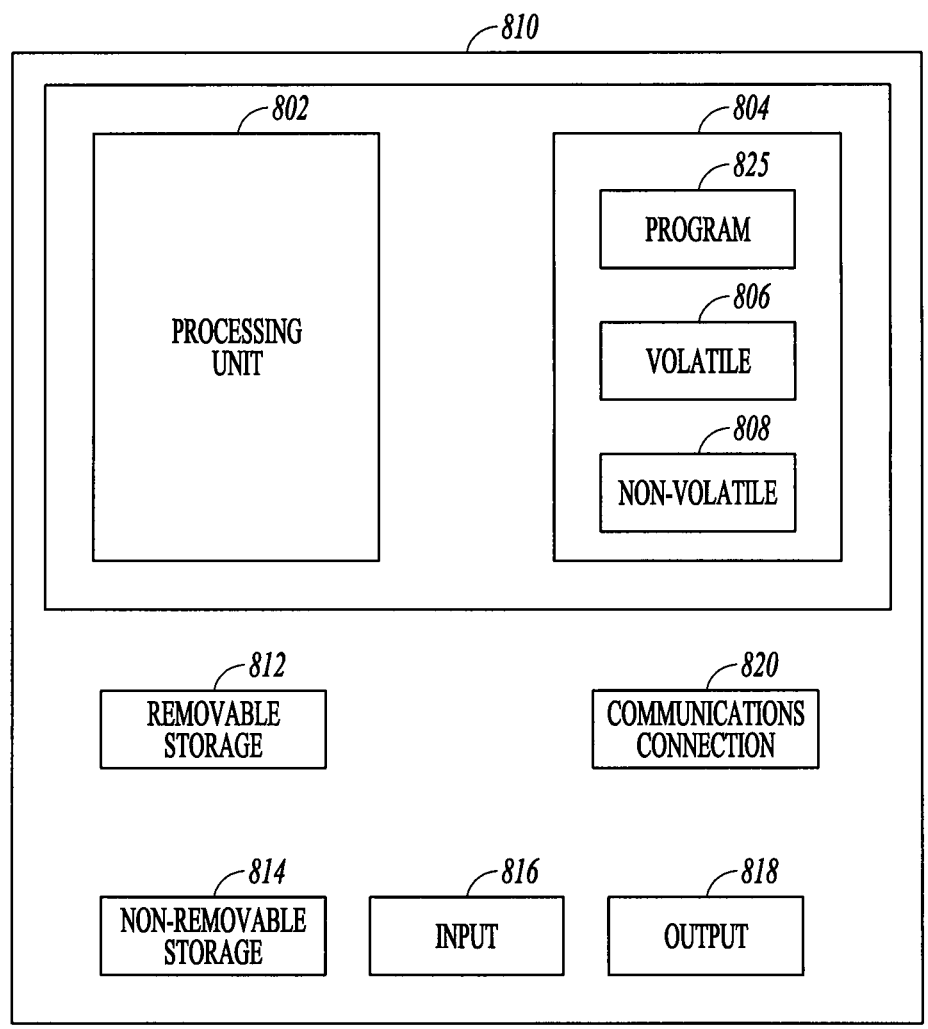
FIG. 8 is a block diagram of a specifically programmed computer system for managing resource allocation according to an example embodiment.

A block diagram of a computer system that executes programming for managing resource allocation implementing the above algorithms is shown in FIG. 8. A general computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:

1. A computer implemented method comprising:
   providing information related to wind speed and direction prediction to a wind turbine energy prediction module running on the computer;
   providing wind energy production prediction information from the wind turbine energy prediction module to a resource allocation engine running on the computer; and
   combining the wind energy production prediction information with power level information for non-renewable energy resources to provide an output identifying energy production resources to use for optimal load servicing.

2. The method of claim 1 wherein the information related to wind speed prediction and direction comprises a feed from a weather service correlated with local topography to form a mesoscale forecast.

3. The method of claim 2 wherein the information related to wind speed prediction comprises historical wind speed and direction information correlated to specific wind turbines.

4. The method of claim 1 wherein the information related to wind speed and direction prediction comprises wind speed and direction simulation data.

5. The method of claim 1 wherein wind energy production prediction information is a function of predicted wind speed, wind direction, and wind power curves for specific wind turbines.

6. The method of claim 1 wherein wind energy production prediction information includes:
   retrieving a sample of historical local wind speed and direction data in past situations with mesoscale predictions similar to a current mesoscale predicted wind speed and direction; and
   computing a wind turbine location specific prediction of wind speed and direction by statistical interpolation or extrapolation from the retrieved sample.

7. The method of claim 1 wherein wind energy production prediction information includes:
   receiving a forecast in the form of most likely values at specified times and/or peak values over specified periods of time;
   using the received forecast to generate daily curves of forecasted variables by combining the forecast and climatic data for a given locality;
   calibrating the daily forecast curves to compensate for deviations of on-site sensor readings from the meteorological measurements; and
   correcting the calibrated daily forecast curves to compensate for forecast errors.

8. The method of claim 1 wherein power level information for non-renewable energy resources includes pricing data, and is used to provide for optimal utilization of energy producing resources for load servicing.

9. The method of claim 1 wherein wind energy production prediction information includes:
   retrieving a sample of historical wind generation data in situations similar to a mesoscale predicted wind speed and direction; and
   computing a wind turbine location specific prediction of wind generation by statistical interpolation or extrapolation from the retrieved sample.

10. A computer readable device having instructions for causing a computer to implement a method, the method comprising:
    providing information related to wind speed and direction prediction to a wind turbine energy prediction module running on the computer;
    providing wind energy production prediction information from the wind turbine energy prediction module to a resource allocation engine running on the computer; and
    combining the wind energy production prediction information with power level information for non-renewable energy resources to provide an output identifying energy production resources to use for optimal load servicing.

11. The computer readable device of claim 10 wherein the information related to wind speed prediction and direction comprises a feed from a weather service and includes historical wind speed and direction information correlated to specific wind turbines.

12. The computer readable device of claim 10 wherein the information related to wind speed and direction prediction comprises wind speed and direction simulation data and wherein wind energy production prediction information is a function of predicted wind speed, wind direction, and wind power curves for specific wind turbines.

13. The computer readable device of claim 10 wherein wind energy production prediction information includes:
    retrieving a sample of historical local wind speed and direction data in past situations with mesoscale predictions similar to a current mesoscale predicted wind speed and direction; and
    computing a wind turbine location specific prediction of wind speed and direction by statistical interpolation or extrapolation from the retrieved sample.

14. The computer readable device of claim 10 wherein wind energy production prediction information includes:
    a forecast in the form of most likely values at specified times and/or peak values over specified periods of time;
    wherein the received forecast is used by the executing instructions to generate daily curves of forecasted variables by combining the forecast and climatic data for a given locality;
    wherein the daily forecast curves are used by the executing instructions to compensate for deviations of on-site sensor readings from the meteorological measurements; and
    the calibrated daily forecast curves are corrected by the executing instructions to compensate for forecast errors.

15. The computer readable device of claim 10 wherein power level information for non-renewable energy resources includes pricing data, and is used to provide for optimal utilization of energy producing resources for load servicing.

16. The computer readable device of claim 10 wherein wind energy production prediction information includes:
    retrieving a sample of historical wind generation data in situations similar to a meso scale predicted wind speed and direction; and
    computing a wind turbine location specific prediction of wind generation by statistical interpolation or extrapolation from the retrieved sample.

17. A system comprising:
    a wind turbine energy prediction module running on the computer to receive information related to wind speed and direction prediction;
    a resource allocation engine running on the computer to receive wind energy production prediction information from the wind turbine energy prediction module to; and
    a processing module running on the computer to combine the wind energy production prediction information with power level information for non-renewable energy resources to provide an output identifying energy production resources to use for optimal load servicing.

18. The system of claim 17 wherein the information related to wind speed prediction and direction comprises a feed from a weather service and the information related to wind speed prediction comprises historical wind speed and direction information correlated to specific wind turbines.

19. The system of claim 17 wherein the information related to wind speed and direction prediction comprises wind speed and direction simulation data, and wherein the wind turbine energy prediction module receives wind energy production prediction information that is a function of predicted wind speed, wind direction, and wind power curves for specific wind turbines.

20. The system of claim 17 wherein wind turbine energy prediction module receives wind energy production prediction information that includes:
    a sample of data similar to a meso scale predicted wind speed and direction, and the wind energy turbine energy prediction module computes a wind turbine location specific prediction of wind speed and direction by statistical interpolation or extrapolation from the found sample of data.

21. The system of claim 17 wherein wind energy production prediction module further:
    receives a forecast in the form of most likely values at specified times and/or peak values over specified periods of time;
    uses the received forecast to generate daily curves of forecasted variables by combining the forecast and climatic data for a given locality;
    calibrates the daily forecast curves to compensate for deviations of on-site sensor readings from the meteorological measurements; and
    corrects the calibrated daily forecast curves to compensate for forecast errors.

22. The system of claim 17 wherein power level information for non-renewable energy resources includes pricing data, and is used to provide for optimal utilization of energy producing resources for load servicing.

* * * * *